March 14, 1950
J. E. GANTT
2,500,353
PROCESS FOR FRACTIONALLY SEPARATING A MIXTURE
OF NORMALLY GASEOUS COMPONENTS
Filed Dec. 21, 1946
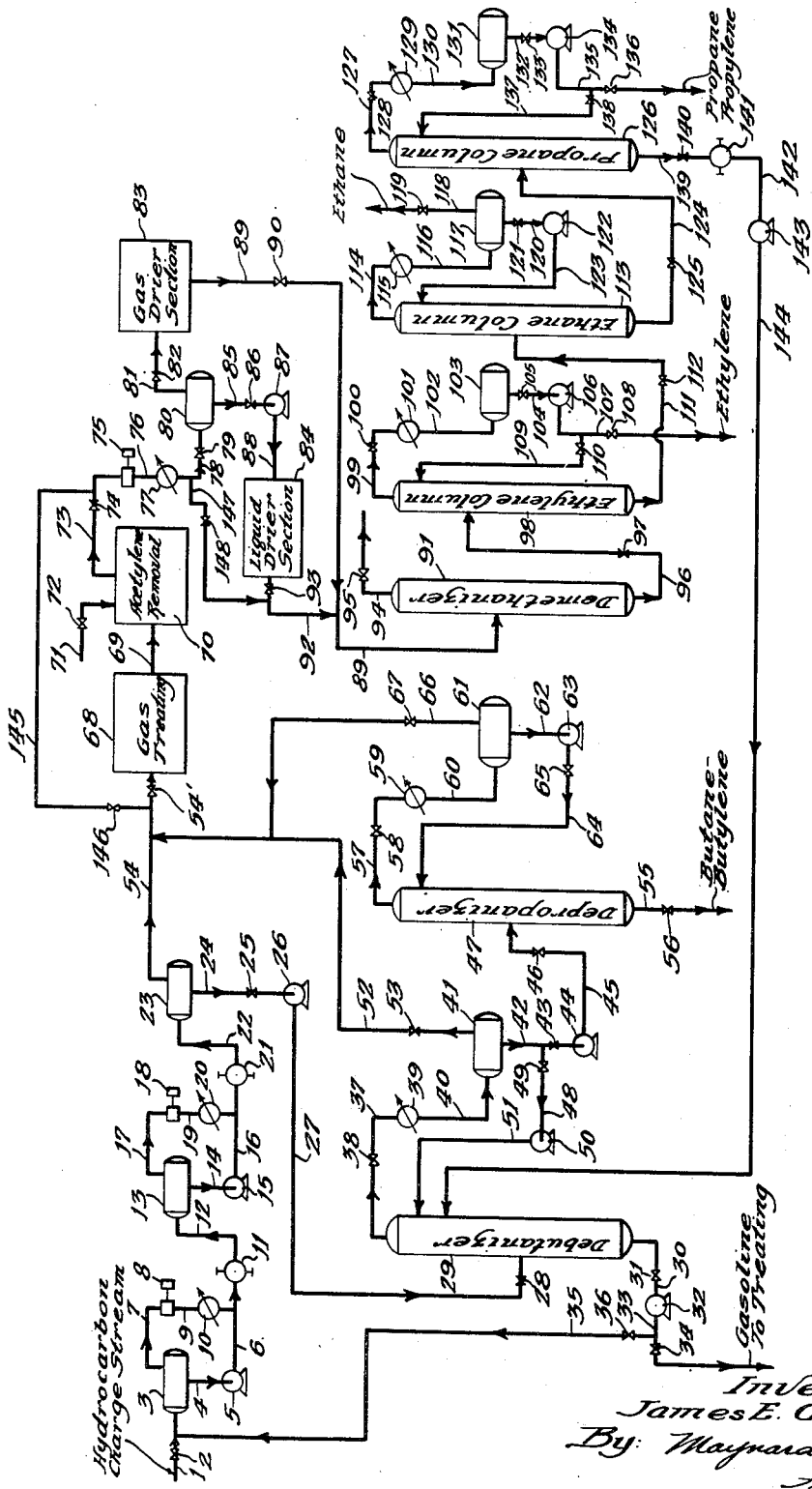
Inventor:
James E. Gantt
By: Maynard P. Venema
Attorney Patented Mar. 14, 1950

2,500,353

UNITED STATES PATENT OFFICE 2,500,353

PROCESS FOR FRACTIONALLY SEPARATING A MIXTURE OF NORMALLY GASEOUS COMPONENTS

James E. Gantt, Chicago, Ill., assignor to Universal Oil Products Company, Chicago, Ill., a corporation of Delaware Application December 21, 1946, Serial No. 717,656

11 Claims. (Cl. 260—683)

This invention relates to a method for fractionally separating a mixture of normally gaseous components of different boiling points to isolate substantially pure compounds or close-cut fractions therefrom.

More specifically this invention involves a novel combination of the cooperative steps of separating light gaseous fractions from heavier components by partial liquefaction and solution at low temperatures, purification of selected gas fractions, and low-temperature fractionation under elevated pressures, with a resulting more efficient separation of desired individual compounds or fractions of narrow boiling range from complex mixtures.

The invention is particularly applicable to hydrocarbon mixtures which are principally gaseous and which may result from a cracking process for the production of normally gaseous unsaturated hydrocarbons. It is not intended to limit the invention, however, to any particular mixture or gas stream, for the present method of operation is applicable to hydrocarbon mixtures containing normally liquid hydrocarbons as well as normally gaseous constituents having relatively close boiling points such as methane, ethylene, acetylene, ethane, propylene, propane and other normally gaseous components. While the process of this invention will hereinafter be more fully described and illustrated with particular reference to the separation of complex low boiling hydrocarbon mixtures it will be apparent that this process may be applied successfully also to other complex mixtures obtained by chemical synthesis such as, for example, the effluent products from various oxidation nitration and the like reactions of organic compounds, and the low boiling products which result from the various catalytic conversions of carbon monoxide-hydrogen mixtures and which may contain substantial amounts of oxygenated hydrocarbonaceous compounds.

Various normally gaseous hydrocarbons are in demand for the production of organic compounds or for other chemical processes. For example, ethylene is desirable for producing alcohols, or as the starting material for the production of certain types of plastics; propane-propylene and butane-butene fractions are valuable not only for bottle gas in many localities, but are increasingly required for use as a starting material for the synthesis of rubber and resins. It is therefore a principal object of this invention in its preferred embodiments to provide an improved method for recovering normally gaseous compounds from other closely boiling hydrocarbon components in a manner to provide substantially pure hydrocarbon fractions.

In one broad aspect the invention provides a process for fractionally separating a mixture of normally gaseous components of different boiling points which comprises partially liquefying and cooling the mixture in the presence of a higher boiling liquid medium capable of dissolving relatively high boiling normally gaseous components of said mixture, separating an unliquefied gas fraction and a liquid fraction containing a substantial portion of said relatively high boiling normally gaseous components, subjecting said liquid fraction to a stabilizing fractionation and therein vaporizing regulated amounts of said relatively high boiling normally gaseous components under refluxing conditions from said liquid fraction, recirculating controlled amounts of the resultant stabilized liquid to the partial liquefying step, partially condensing the vapors issuing from the stabilizing fractionation and separating them into an uncondensed fraction and a condensed fraction, commingling at least a portion of said uncondensed fraction with at least a portion of said unliquefied gas fraction, subjecting the thus commingled fractions to a separate fractionation under refluxing conditions and therein separating at least one fractionated low boiling product from higher boiling fractions, recovering said fractionated low boiling product and recirculating at least a portion of said higher boiling fractions to the stabilizing fractionation.

In a preferred embodiment of applying this invention to the fractional separation of a mixture comprising ethylene and lower and higher boiling normally gaseous components, the mixture is partially liquefied and cooled in the presence of normally liquid hydrocarbons boiling in the gasoline boiling range, an unliquefied gas fraction is separated from the resultant liquid fraction which later contains a substantial portion of the normally gaseous components boiling above ethylene, said liquid fraction is subjected to a stabilizing fractionation wherein at least a substantial portion of the normally gaseous components boiling above ethylene and substantially all dissolved ethylene are vaporized and liberated from the liquid fraction under refluxing conditions, controlled amounts of the resultant stabilized hydrocarbon liquid are recirculated to the partial liquefying step, a substantial portion of the vapors issuing from the stabilizing fractionation is condensed and a heavy normally gaseous fraction substantially free of ethylene is fractionated in a separate second fractionation step from the condensed portion of said vapors, this heavy normally gaseous fraction is recovered as a product of the process, at least a portion of the remaining gaseous products of the stabilizing fractionation and of the separate second fractionation is commingled with at least a portion of the unliquefied gas fraction, the thus commingled gas fractions are subjected to fractionation under refluxing conditions in a separate third fractionation step wherein a light gas fraction boiling below ethylene and an ethylene fraction are separated from each other and from higher boiling fractions, said light gas fraction and said ethylene fraction are recovered as products of the process and at least the highest boiling portion of said higher boiling fractions is returned from the third fractionation step to the stabilizing fractionation.

In an other aspect the present invention also provides a process for recovering a substantially pure ethylene fraction from a mixture containing ethylene and lower and higher boiling components including acetylene wherein the mixture is separated into high boiling fractions free of ethylene and a lower boiling normally gaseous fraction containing ethylene, this lower boiling normally gaseous fraction is subjected to a separate fractionation under refluxing conditions wherein an ethylene fraction is separated from at least one lighter fraction and at least one heavier fraction, at least a portion of said heavier fraction is recirculated to said separation of said mixture, and the acetylene is converted into a hydrocarbonaceous compound of higher molecular weight than that of acetylene at a point in the process prior to said fractionation under refluxing conditions. This embodiment of the invention may be applied with particular advantage to a hydrocarbon mixture constituted by the effluent light products of a cracking operation wherein there are produced substantial yields of ethylene, other low boiling olefins, and a relatively small amount of acetylene.

A preferred mode of applying the present process to the recovery of ethylene fraction from a mixture containing also other normally gaseous components including acetylene contemplates the hydrogenation of the acetylene into ethylene in order that an increased yield of an ethylene fraction of particularly high purity may result from the fractionation and recovery operation of this invention. Hydrogen may be added to the gas stream to effect the desired acetylene conversion; the invention, however, contemplates also an operation wherein the gas mixture to be fractionally separated is obtained from a cracking operation conducted in such manner that the gas mixture contains a substantial amount of ethylene and at the same time an amount of hydrogen in a molecular concentration at least equal to the molecular concentration of any acetylene which has been produced therewith. Thus, in a more specific embodiment according to the present invention the initial hydrocarbon gas mixture is separated into high boiling fractions substantially free of acetylene and into a lower boiling normally gaseous fraction containing ethylene, acetylene and hydrogen, at least a major portion of the acetylene contained in said normally gaseous fraction is hydrogenated with said hydrogen to form ethylene, the resultant gas stream is subjected to fractionation under refluxing conditions and therein an ethylene fraction is separated from at least one lighter fraction and at least one heavier fraction, and at least a portion of said heavier fraction is recirculated to the step of initial separation of said hydrocarbon gas mixture.

To further illustrate the features and advantages of the present invention, reference is made to the accompanying drawing and the following description thereof.

A hydrocarbon charge stream, containing a desired normally gaseous component, and other lighter and heavier components, is supplied through line 1 and valve 2 to a separating chamber 3. A gaseous fraction is separated from the liquid fraction in chamber 3, wherefrom the liquid fraction is withdrawn by way of line 4 and pump 5 into line 6, while the gaseous fraction is withdrawn by way of line 7 and subjected to partial condensation and liquefaction by compression in the compressor 8 and cooling in the cooler 10, which communicates with the discharge side of compressor 8 by line 9. The compressed and partially cooled material is commingled with the liquid fraction in line 6 and the combined stream from line 6 is subjected to further cooling in the exchanger 11 and is passed therefrom by way of line 12 to a separator 13. Within chamber 13, gaseous and liquid fractions are again separated from each other, the liquid fraction being withdrawn through line 14 to pump 15 and discharged therefrom into line 16, while the gaseous fraction is withdrawn from chamber 13 by way of line 17 and is subjected to a further increase in pressure and to partial liquefaction or condensation by means of compressor 18 and cooler 20, which communicates with the compressor 18 by line 19, and the material from this second compression and cooling stage is combined with the liquid fraction in line 16. The resutling high pressure products in line 16 are passed through the exchanger 21 to line 22 and the separating chamber 23. While the drawing and the foregoing description indicate two stages of compression for the partial liquefaction of the gaseous stream, it should be understood that more or less stages of compression and cooling may be used to secure the partial liquefaction and the high pressure desired for the subsequent fractionation and separation steps. It is also to be understood that merely a normally gaseous mixture may be supplied as charge for the process from an outside source to the partial liquefaction operation and that a suitable normally liquid medium, such as for example a gasoline fraction may be kept in circulation through the system.

In a preferred operation, wherein a substantially pure ethylene fraction is the desired normally gaseous hydrocarbon product, the first stages and/or stages of compression are operated to produce a superatmospheric pressure of the order of 15 atmospheres and a product temperature of the order of 35—40° C. The liquid fraction from separator 23, thus containing principally condensed or dissolved $C_3$ and $C_4$ fractions and smaller amounts of lighter components is passed by way of line 24, having valve 25, to pump 26 from which it is discharged through line 27 and valve 28 to a debutanizing fractionating column 29. The liquid stream is subjected to fractionation within the debutanizer 29 under refluxing conditions such that substantially all of the normally gaseous components or at least a controlled substantial portion thereof is vaporized and separated from the liquid fraction and a residual or so-called stabilized liquid is obtained which is, in the particular case of this illustration, a stabilized gasoline and which is withdrawn from the lower end of the debutanizer by way of line 30, having control valve 31 and pump 32. A portion of the gasoline stream may be discharged through line 33, having valve 34, to gasoline treating and storage since renewed quantities of the gasoline hydrocarbons enter the system with the mixture of normally gaseous components in this particular case. Controlled portions of the stabilized liquid are recycled, in the preferable operation, by way of line 35 having control valve 36, to the charge line 1 such that a relatively gas free solvent stream may be built up within the compression and partial liquefaction zone in excess of any normally liquid components present in the charge supplied from outside the process.

The normally gaseous hydrocarbon stream is discharged from the debutanizer 29 through line 37 and control valve 38 and is passed through a cooler 39 and line 40 to a separating chamber 41. A condensed fraction, which is principally composed of $C_4$ fractions but contains also lower boiling components, is separated within chamber 41 from a fraction consisting largely of $C_3$ and lighter components. The liquid fraction from separator 41 is passed through line 42 and valve 43 to pump 44 and is discharged therefrom through line 45 and valve 46 into a depropanizing fractionating column 47. A portion of the $C_4$ fractions may be returned as refluxing medium from separator 41 to the debutanizer column 29 by way of line 48, control valve 49, pump 50, and line 51. The gaseous fraction from separator 41 is discharged therefrom by way of line 52 and control valve 53 to be subsequently commingled with the light gaseous fraction, which is discharged from separator 23 by way of line 54 and which has a high content of $C_2$ and lighter components. The liquid fraction charged from separator 41 to the depropanizer 47 is subjected therein to fractionation under refluxing conditions such that a butane-butylene fraction which is substantially free from ethylene and acetylene is separated from a lower boiling gaseous fraction and is recovered as a liquid stream which is withdrawn through line 55 and control valve 56 from the lower end of the column 47, while the lower boiling gaseous fraction, consisting largely of $C_3$ and lighter components, is discharged from the upper end of column 47 through line 57 and valve 58 to a cooler 59. The gaseous stream is partially condensed in cooler 59 and is passed through line 60 to separator 61 wherein liquid and gaseous fractions are separated to provide a reflux stream and a gaseous discharge stream. The liquid reflux stream is withdrawn from separator 61 through line 62 and passed to pump 63 from which it is discharged through line 64 and control valve 65 to the upper end of the depropanizer column 47 as a reflux medium. The gas stream from separator 61 consisting largely of $C_3$ and lighter components is passed by way of line 66, having control valve 67, to be commingled with the gas stream in line 52.

It may be noted from the foregoing description of the operation and from the accompanying drawing, that the normally liquid hydrocarbons and the $C_4$ fraction are separated from the hydrocarbon charge stream by a condensing and fractionation system which avoids the use of an absorption column and provides a resulting light gaseous stream containing principally $C_3$ and lighter gaseous components, all of which are combined and commingled within line 54.

Continuing with the description of a preferred operation of the invention as illustrated in the accompanying diagrammatic drawing, the stream of commingled gas fractions passing through line 54 is charged to a gas treating section 68 wherein the stream may be subjected to sulfur removal and to such other purification treatments as may be deemed necessary to provide a gas substantially free from undesirable impurities. The gas purification treatments may include Girbotal-treating, caustic wash, mercaptan extraction, and the like all of which are well known to the refining art. The gas stream is discharged from the gas treating section 68 by way of line 69 and passed to an acetylene conversion or removal section 70. Acetylene within the gas stream is preferably converted in the section 70 to ethylene or generally speaking, to a hydrocarbonaceous compound of higher molecular weight than the molecular weight of acetylene. This conversion, in a specific example may be effected in the presence of hydrogen with the aid of a suitable hydrogenating catalyst such as platinum or palladium supported on silica. In an operation, wherein the gas stream does not contain an adequate quantity of hydrogen to effect the desired hydrogenation of the acetylene, hydrogen may be added from an external source by way of line 71, having control valve 72. It is not contemplated to limit this invention to a conversion of the acetylene with the aid of any particular type of catalyst, nor is the treatment in section 70 intended to be limited to a catalytic conversion of the acetylene. Generally, however, it is necessary that practically all of the acetylene, if present, be removed or converted where substantially pure ethylene is a desired lighter product of the process. The gas stream following the acetylene removal operation, is discharged from unit 70 by way of line 73, having control valve 74 to compressor 75. The gas stream may thus be subjected to a further increase in pressure, to the order of 40 atmospheres, in order to facilitate the subsequent fractionation and separation of the closely boiling components or fractions.

The mixed stream leaving compressor 75 at the high superatmospheric pressure is passed through line 76 and through a cooler 77 to line 78, having control valve 79, and therefrom to separator 80. The gaseous fraction separating within separator 80 may be passed by way of line 81 and control valve 82 to a gas drying section 83, while the liquid fraction from separator 80 may be passed to a liquid drying section 84 by way of the line 85, having control valve 86, the pump 87 and the line 88. The gas drying section 83 and the liquid drying section 84 may comprise suitable and conventional drying media and apparatus in order that the gas and liquid fractions may be substantially dehydrated prior to their discharge to the subsequent fractionating steps. The gas stream, substantially dried, is passed from the unit 83 through line 89 and valve 90 to the demethanizer column 91 of the fractionating system, while the liquid fraction substantially dried, is passed from the unit 84 by way of line 92 and valve 93 and is then commingled in line 89 with the gas stream flowing to the demethanizer 91.

The light hydrocarbon stream which is supplied at the above noted high superatmospheric pressure through line 89 to further fractionation comprises essentially a fraction separated as unliquefied gas fraction in the initial partial liquefying operation, and uncondensed gas fractions from the debutanizing and depropanizing operations, all of which fractions have been commingled and preferably freed from undesired impurities; this stream is subjected to a fractionation within the demethanizer 91 at a sufficiently low temperature which at the high pressure employed assures substantial separation of all components boiling below ethylene as a so-called uncondensable gas, which is removed from the upper end of the demethanizer column 91 by way of line 94 and control valve 95 while the $C_2$ and heavier fractions are obtained as a liquid stream which may be withdrawn from the lower end of the demethanizer 91 by way of line 96 and control valve 97 to be supplied to the ethylene column 98. The operation of the demethanizer and other subsequent fractionating columns may be conventional in that reboilers may be used at the lower end of each of the columns to provide heat for reboiling the material within the columns; however, for simplification of the drawing and of the following description, the conventional equipment including reboilers and control instruments for observing and controlling temperatures and pressures and the like are not indicated and described specifically. Also, though not shown, a refrigerated cooling medium may be used to provide a reflux stream at a temperature considerably below atmospheric temperature, for example about $-90°$ C., in the upper portion of the demethanizer column and to thereby secure an efficient fractionation and separation in said column.

The charge supplied from the demethanizer 91 to the ethylene column 98 may be decreased in pressure, to the order of 27 atmospheres and fractionated therein to separate and recover a substantially pure ethylene product. The gaseous stream consisting essentially of ethylene, is withdrawn from the upper end of the column 98 by way of line 99 having valve 100 and is substantially condensed by means of a cooler 101. The condensed fraction, which is substantially pure ethylene is passed from cooler 101 by way of line 102 to a receiver 103. Ethylene may be withdrawn from receiver 103 by way of line 104 and valve 105 for recirculation purposes and for passage to suitable storage. Pump 106 discharging into line 107 and valve 108, provides means to pass the ethylene to storage as well as to recirculate a regulated portion of the condensed fraction as refluxing medium by way of line 109, having control valve 110, to the upper part of the ethylene column 98 to maintain therein a temperature of about $-14.5°$ C. The bottom liquid from the ethylene column, containing essentially ethane and heavier components is passed by way of line 111 and valve 112 to an ethane separating column 113. Deethanization is carried out within the fractionating column 113 preferably under conditions providing substantially the same superatmospheric pressure but somewhat higher temperatures in the latter column as compared to the pressure and temperatures in the ethylene column. The gas stream separated in the top of column 113 at a temperature of about $9°$ C. passes through line 114, cooler 115 and line 116 to separator 117. The resulting cooled and partially condensed products are separated within the receiver 117 into a gas stream, principally consisting of ethane, which is discharged therefrom by way of line 118 and valve 119, and into a condensate which is desirable for recirculating as refluxing medium; this condensate may be supplied from the separator 117 to the deethanizing column 113 through withdrawal line 120, valve 121, pump 122 and discharge line 123.

The bottom liquid from the ethane column 113 may be passed by way of line 124 and valve 125 to a propane separating column 126. The fractionation within the latter column may be carried out under a still further decreased pressure of the order of 17 atmospheres, and at a somewhat increased top temperature, of the order of 40–45° C. The resulting fractionated vapors, containing principally propane - propylene, are withdrawn from the upper end of the column 126 through line 127 and valve 128, and are then passed through cooler 129 and discharged through line 130 to receiver 131. The condensed propane-propylene fraction may then be passed from the receiver 131 to storage or for further treatment, through withdawal line 132, valve 133, pump 134, line 135 and valve 136. However, regulated portions of the condensed fraction being withdrawn from receiver 131 may be recirculated to the upper end of the propane column 126 as refluxing medium by means of line 137 and control valve 138.

The bottom liquid from the propane column 126 is withdrawn through line 139 and valve 140 and passed through cooler 141 and line 142 to pump 143. This pump 143 forces the liquid stream through line 144 to the debutanizing fractionator 29, wherein this stream acts as a liquid reflux and at the same time undergoes renewed fractionation. The bottom liquid from column 126, in the operation of this invention, contains the highest boiling components of the fractions supplied to the low temperature fractionation beginning with the deethanizer column 91; and in the particular case of the operation specifically described herein with reference to the drawing this bottom liquid will contain principally $C_4$ and heavier components which have been carried over from the separating and fractionation steps preceding the aforesaid low-temperature fractionation.

It will be apparent from the foregoing description that in some modes of operation a part or all of the gas purification section 68, or the acetylene removal section 70, or both of these sections may not be required for producing the desired light products of the process. In some cases, for example, the commingled gas fractions in line 54 may not require desulfurization; and in some cases, depending on the composition of the desired final light products and on the nature and origin of the gas mixture in line 54, this mixture may not require any acetylene removal. Thus, when it is desired to exclude both sections 68 and 70 from the system, the commingled light gas stream resulting in line 54 may be supplied directly to the demethanizer 91 by means of line 145 and control valve 146, the valves 54' and 74 being closed in such case. Means for by-passing only a portion of the sections 68 and 70 are not illustrated in the drawing since the construction and arrangement of such means will be well understood in the art.

Gaseous hydrocarbon mixtures contemplated as typical charging stocks for the present process usually contain moisture which tends to lead to the formation of hydrocarbon hydrates under the operating conditions of low temperatures and high pressures preferably employed in the compression and partial liquefication step using compressor 75 and cooler 77 and in the subsequent fractionation. In order to avoid such hydrate formation it is almost always necessary to employ the dryer sections 83 and 84 when treating a charge comprising normally gaseous hydrocarbons. Provision is made, however, for by-passing these dryer sections whenever a gas mixture which requires no dehydration is obtained in line 54. To this end, the line 147, having control valve 148 may be used between line 78 and line 92 such that the compressed and partially liquefied gas stream issuing from cooler 77 is conducted through line 147, valve 148, line 92 and line 89 to the demethanizer 91 and subsequent fractionating columns, the valves 79 and 83 remaining closed in this particular mode of operation.

While the drawing and foregoing description have outlined a preferred and specific embodiment of the invention and certain alternative modes of operation thereof, other modifications may be made in the details of operation and in the arrangement of apparatus therefor without departing from the spirit and scope of the invention. For example, the acetylene removal zone may be incorporated in the system at substantially any point in the line of flow of the light uncondensed gas stream, prior to the final fractionating section. In an alternative combination, the acetylene removal section may be placed within the partial liquefaction step, for example after the first stage of compression in the hydrocarbon charge and before the cooler 11. It may also be noted, that the partial liquefaction operation may be accomplished by one or more compression and condensation operations and is not necessarily limited to the exact number specifically described and illustrated in the drawing.

I claim as my invention:

1. A process for fractionally separating a mixture of normally gaseous components of different boiling points which comprises partially liquefying and cooling said mixture in the presence of a higher boiling liquid medium capable of dissolving high boiling normally gaseous components of said mixture, separating an unliquefied gas fraction and a liquid fraction containing a substantial portion of said relatively high boiling normally gaseous components, subjecting said liquid fraction to a stabilizing fractionation and therein vaporizing regulated amounts of said relatively high boiling normally gaseous components under refluxing conditions from said liquid fraction, recirculating controlled amounts of the resultant stabilized liquid to said partial liquefying step, partially condensing the vapors issuing from said stabilizing fractionation and separating them into an uncondensed fraction and a condensed fraction, commingling at least a portion of said uncondensed fraction with at least a portion of said unliquefied gas fraction, subjecting the thus commingled fractions to a separate fractionation under refluxing conditions and therein separating at least one fractionated low boiling product from higher boiling fractions, recovering said fractionated low boiling product and recirculating at least a portion of said higher boiling fractions directly from said separate fractionation to said stabilizing fractionation.

2. A process for fractionally separating a mixture comprising $C_4$ hydrocarbons and lower boiling components which comprises partially liquefying and cooling said mixture in the presence of higher boiling hydrocarbons, separating an unliquefied gas fraction from the resultant liquid fraction containing a substantial portion of said $C_4$ hydrocarbons, subjecting said liquid fraction to a stabilizing fractionation and therein vaporizing at least a substantial portion of said $C_4$ hydrocarbons and substantially all of the components boiling below said $C_4$ hydrocarbons from said liquid fraction under refluxing conditions, recirculating controlled amounts of the resultant stabilized hydrocarbon liquid to said partial liquefying step, condensing a substantial portion of the vapors issuing from said stabilizing fractionation and fractionating a $C_4$ hydrocarbon fraction in a separate second fractionation step from the condensed portion of said vapors, recovering said $C_4$ hydrocarbon fraction as a product of the process, commingling at least a portion of the remaining gaseous products of said stabilizing fractionation and said separate second fractionation with at least a portion of said unliquefied gas fraction, subjecting the thus commingled fractions to fractionation under refluxing conditions in a separate third fractionation step and therein separating at least one low boiling product substantially free of $C_4$ hydrocarbons from higher boiling fractions, recovering said low boiling product and recirculating at least the highest boiling portion of said higher boiling fractions directly from said third fractionation step to said stabilizing fractionation.

3. A process for fractionally separating a mixture comprising ethylene and lower and higher boiling normally gaseous components, which comprises partially liquefying and cooling said mixture in the presence of normally liquid hydrocarbons boiling in the gasoline boiling range, separating an unliquefied gas fraction from the resultant liquid fraction containing a substantial portion of the normally gaseous components boiling above ethylene, subjecting said liquid fraction to a stabilizing fractionation and therein vaporizing at least a substantial portion of said normally gaseous components boiling above ethylene and concomitantly liberating substantially all dissolved ethylene from said liquid fraction under refluxing conditions, recirculating controlled amounts of the resultant stabilized hydrocarbon liquid to said partial liquefying step, condensing a substantial portion of the vapors issuing from said stabilizing fractionation and fractionating a heavy normally gaseous fraction substantially free of ethylene in a separate second fractionation step from the condensed portion of said vapors, recovering said heavy normally gaseous fraction as a product of the process, commingling at least a portion of the remaining gaseous products of said stabilizing fractionation and said separate second fractionation with at least a portion of said unliquefied gas fraction, subjecting the thus commingled gas fractions to fractionation under refluxing conditions in a separate third fractionation step and therein separating a light gas fraction boiling below ethylene and an ethylene fraction from each other and from higher boiling fractions, recovering said light gas fraction and said ethylene fraction as products of the process and recirculating at least the highest boiling portion of said higher boiling fractions directly from said third fractionation step to said stabilizing fractionation.

4. A process for recovering a substantially pure ethylene fraction from a mixture containing ethylene and lower and higher boiling components including acetylene, which comprises separating said mixture by compression and cooling into high boiling fractions substantially free of ethylene and a lower boiling normally gaseous fraction containing ethylene, subjecting said lower boiling normally gaseous fraction to a separate fractionation under refluxing conditions and therein separating an ethylene fraction from at least one lighter fraction and at least one heavier fraction, recirculating at least a portion of said heavier fraction to said compression and cooling treatment, and converting said acetylene into a hydrocarbonaceous compound of higher molecular weight at a point in the process prior to said fractionation under refluxing conditions.

5. A process for recovering a substantially pure ethylene fraction from a mixture containing lower and higher boiling components, a small amount of acetylene and an amount of hydrogen in a molecular concentration at least equal to the molecular concentration of said acetylene, which comprises separating said mixture by compression and cooling into high boiling fractions substantially free of acetylene and a lower boiling normally gaseous fraction containing ethylene, acetylene and hydrogen, hydrogenating at least a major portion of said acetylene with said hydrogen to form ethylene, subjecting the resultant gas stream to fractionation under refluxing conditions and therein separating an ethylene fraction from at least one lighter fraction and at least one heavier fraction, and recycling at least a portion of said heavier fraction to said compression and cooling treatment.

6. The process of claim 5 further characterized in that the acetylene is catalytically hydrogenated in the presence of said hydrogen to form ethylene.

7. A process for recovering a substantially pure ethylene fraction from a mixture containing ethylene and lower and higher boiling normally gaseous components including acetylene which comprises partially liquefying and cooling said mixture in the presence of normally liquid hydrocarbons and separating the cooled materials into a liquid fraction and an unliquefied gas fraction, fractionating normally gaseous components from said liquid fraction in a first fractionation step and separating them into a low boiling gas fraction containing ethylene and acetylene and a higher boiling normally gaseous fraction substantially free of ethylene and acetylene, commingling said low boiling gas fraction with said unliquefied gas fraction, subjecting the commingled gas fraction to a catalytic hydrogenation treatment wherein the ethylene concentration of said gas fractions is increased by selective hydrogenation of substantially all of the acetylene into ethylene, subjecting the resultant ethylene-containing gas mixture substantially free of acetylene to fractionation in a separate second fractionation step and therein separating an ethylene fraction from at least one lighter fraction and at least one heavier fraction, recirculating at least a portion of said heavier fraction to said first fractionation step, recirculating controlled amounts of the residual liquid product from the first fractionation step to said cooling step, and recovering at least said ethylene fraction, said higher boiling normally gaseous fraction substantially free of ethylene and acetylene, and said lighter gas fraction separately as products of the process.

8. In a process for the recovery of a substantially pure ethylene fraction from a mixture containing lower and higher boiling hydrocarbon components including acetylene, the method which comprises partially liquefying and cooling the hydrocarbon mixture in the presence of normally liquid hydrocarbons to separate an unliquefied gas fraction and a liquid fraction containing normally liquid hydrocarbons and normally gaseous hydrocarbons including $C_3$ and $C_4$ hydrocarbons, subjecting said liquid fraction to debutanization to separate normally gaseous hydrocarbons from normally liquid hydrocarbons, partially condensing the normally gaseous hydrocarbons separated by said debutanization to separate a condensed from an uncondensed fraction, subjecting said condensed fraction to depropanization to separate a $C_3$ hydrocarbon fraction from a $C_4$ hydrocarbon fraction, commingling at least a portion of said $C_3$ fraction and at least a portion of said uncondensed fraction with said unliquefied gas fraction, treating the commingled gaseous stream to remove undesirable impurities, converting acetylene in said commingled gaseous stream into a higher molecular weight hydrocarbon, compressing and partially liquefying the resulting stream from said gas treating and from said acetylene conversion to provide a substantially high pressure condensate and a high pressure gaseous fraction, separately drying said condensate and said high pressure gaseous fraction, combining the dried streams, subjecting the resultant recombined stream to a separate fractionation and therein separating an ethylene fraction from at least one lighter fraction and at least one heavier fraction, and recycling at least a portion of said heavier fraction to said debutanization.

9. In a process for the recovery of a substantially pure ethylene fraction from a mixture containing lower and higher boiling hydrocarbon components including acetylene and an amount of hydrogen in a molecular concentration at least equal to the molecular concentration of said acetylene, the method which comprises partially liquefying and cooling the said hydrocarbon mixture in the presence of normally liquid hydrocarbons to separate an unliquefied gas fraction from a liquid fraction containing normally liquid hydrocarbons and normally gaseous components including $C_3$ and $C_4$ hydrocarbons, subjecting said liquid fraction to debutanization to separate normally gaseous hydrocarbons from normally liquid hydrocarbons, recirculating debutanized liquid hydrocarbons to said partial liquefying operation, partially condensing the normally gaseous hydrocarbons separated by said debutanization to separate a condensed and an uncondensed fraction subjecting said condensed fraction to depropanization to separate a $C_3$ hydrocarbon fraction from a $C_4$ hydrocarbon fraction, commingling at least a portion of said $C_3$ fraction and at least a portion of said uncondensed fraction with said unliquefied gas fraction, treating the commingled gaseous stream to remove undesirable impurities, hydrogenating the acetylene in said commingled gaseous stream into ethylene, compressing and partially liquefying the resulting stream from said gas treating and from said acetylene conversion to provide a substantially high pressure condensate and a high pressure gaseous fraction, separately drying said condensate and said high pressure gaseous fraction, combining the dried streams, subjecting the resultant recombined stream to a separate fractionation and therein separating an ethylene fraction from at least one lighter fraction and at least one heavier fraction, and recycling at least a portion of said heavier fraction to said debutanization.

10. The process of claim 9 further characterized in that said dried condensate and said high pressure gaseous fraction are subjected to fractionation for the separation of a $C_1$ fraction, an ethylene fraction, an ethane fraction, a $C_3$ fraction and a liquid fraction boiling above said $C_3$ fraction, and at least a portion of said liquid fraction is recycled to said debutanization.

11. The process of claim 4 further characterized in that the acetylene is converted into a higher molecular weight hydrocarbonaceous compound by hydrogenation.

JAMES E. GANTT.

REFERENCES CITED

The following references are of record in the file of this patent:

UNITED STATES PATENTS

| Number | Name | Date |
|---|---|---|
| 2,154,676 | Haeuber et al. | Apr. 18, 1939 |
| 2,222,276 | Babcock | Nov. 19, 1940 |
| 2,322,354 | Gerhold et al. | June 22, 1943 |